United States Patent
Allemand et al.

(10) Patent No.: US 10,154,750 B2
(45) Date of Patent: Dec. 18, 2018

(54) HOUSEHOLD ELECTRICAL COOKING APPLIANCE

(71) Applicant: SEB.S.A., Ecully (FR)

(72) Inventors: Bernard Allemand, Velesmes Echevanne (FR); Johann Petitallot, Arceau (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 14/431,090

(22) PCT Filed: Sep. 18, 2013

(86) PCT No.: PCT/FR2013/052149
§ 371 (c)(1),
(2) Date: Mar. 25, 2015

(87) PCT Pub. No.: WO2014/049230
PCT Pub. Date: Apr. 3, 2014

(65) Prior Publication Data
US 2015/0272372 A1 Oct. 1, 2015

(30) Foreign Application Priority Data
Sep. 26, 2012 (FR) ...................................... 12 59068

(51) Int. Cl.
*A47J 27/62* (2006.01)
*A47J 43/07* (2006.01)
(Continued)

(52) U.S. Cl.
CPC ............. *A47J 27/62* (2013.01); *A47J 27/004* (2013.01); *A47J 37/1261* (2013.01); *A47J 37/1266* (2013.01); *A47J 43/0772* (2013.01)

(58) Field of Classification Search
CPC ...... A47J 27/004; A47J 43/0777; A47J 27/62; A47J 37/1261; A47J 37/1266; A47J 43/0772
(Continued)

(56) References Cited

U.S. PATENT DOCUMENTS

| | | | |
|---|---|---|---|
| 4,095,751 A * | 6/1978 | Artin ..................... | A47J 43/046 222/410 |
| 4,113,188 A * | 9/1978 | Belinkoff ................ | A47J 43/06 241/282.1 |

(Continued)

FOREIGN PATENT DOCUMENTS

CN 201150464 Y 11/2008
CN 201571916 U 9/2010
(Continued)

*Primary Examiner* — Anne M Antonucci
*Assistant Examiner* — Renee LaRose
(74) *Attorney, Agent, or Firm* — The Webb Law Firm

(57) ABSTRACT

Provided is a household electrical food-cooking appliance including: a housing having a container arranged such as to receive the food to be cooked; a removable cover arranged such as to close the container while cooking; at least one safety switch arranged in the housing in order to turn off at least one electrical circuit of the appliance when the cover is not closing the container and in order to turn on said at least one electrical circuit when the cover is closing the container; and a cam having at least one control surface arranged such as to actuate a key for controlling said at least one safety switch in a direction in which the control key is pressed. Said appliance is characterized in that the cover includes a control finger arranged such as to actuate a surface for inputting the cam in a direction for moving the input surface in a direction that is different from the one in which the key is pressed while the container is open, such as to turn off said at least
(Continued)

one electrical circuit, and while the container is closed, such as to turn on said at least one electrical circuit.

8 Claims, 1 Drawing Sheet

(51) Int. Cl.
*A47J 27/00* (2006.01)
*A47J 37/12* (2006.01)

(58) Field of Classification Search
USPC .......................................................... 99/337
See application file for complete search history.

(56) References Cited

U.S. PATENT DOCUMENTS

| | | | | |
|---|---|---|---|---|
| 4,174,073 A * | 11/1979 | Maher | ............... | A47J 43/046 241/282.1 |
| 4,184,641 A * | 1/1980 | Coggiola | ............... | A47J 43/046 241/282.1 |
| 4,285,473 A * | 8/1981 | Williams | ............... | A47J 43/046 188/166 |
| 4,307,287 A | 12/1981 | Weiss | | |
| 4,396,159 A * | 8/1983 | Podell | ............... | A47J 43/046 241/37.5 |
| 4,506,836 A * | 3/1985 | Williams | ............... | A47J 43/046 241/282.1 |
| 4,520,717 A * | 6/1985 | Bohrer, Jr. | ............... | A47J 36/38 169/65 |
| 4,913,038 A * | 4/1990 | Burkett | ............... | A47J 37/1266 99/329 R |
| 4,941,403 A * | 7/1990 | Cimenti | ............... | A47J 19/027 215/285 |
| 5,353,697 A * | 10/1994 | Venturati | ............... | A47J 43/046 241/37.5 |
| 5,550,343 A * | 8/1996 | Borger | ............... | A47J 43/07 200/567 |
| 5,740,721 A * | 4/1998 | Bizard | ............... | A47J 27/62 126/374.1 |
| 5,809,872 A * | 9/1998 | Sundquist | ............... | A47J 43/046 241/37.5 |
| 5,979,806 A * | 11/1999 | Borger | ............... | A47J 44/00 241/101.01 |
| 7,993,694 B2 * | 8/2011 | Goderiaux | ............... | A47J 36/165 366/304 |
| 8,109,201 B2 * | 2/2012 | Schandel | ............... | A47J 27/004 206/563 |
| 8,208,801 B2 * | 6/2012 | Brown | ............... | A47J 27/004 219/238 |

FOREIGN PATENT DOCUMENTS

| | | |
|---|---|---|
| CN | 102334898 A | 2/2012 |
| CN | 202154560 U | 3/2012 |
| EP | 2248452 A1 | 11/2010 |
| EP | 2433533 A1 | 3/2012 |
| FR | 2769199 A1 | 4/1999 |
| WO | 2012041660 A1 | 4/2012 |

\* cited by examiner

HOUSEHOLD ELECTRICAL COOKING APPLIANCE

CROSS-REFERENCE TO RELATED APPLICATIONS

This application is the United States national phase of International Application No. PCT/FR2013/052149 filed Sep. 18, 2013, and claims priority to French Patent Application No. 1259068 filed Sep. 26, 2012, the disclosures of which are hereby incorporated in their entirety by reference.

BACKGROUND OF THE INVENTION

Field of the Invention

The present invention relates in a general manner to a household electrical cooking appliance, and in particular to such an electrical appliance comprising an electrical circuit to be turned off in order to stop the electrical cooking process for safety if a cover of this appliance is removed.

Description of Related Art

Known to the prior art is document CN 201150464Y, which discloses a rice cooker with a two-part cover. A switch is interposed between the two parts of the cover for turning off the power supply circuit of the cooker if the user forgets to assemble one of the parts and still tries to turn on the appliance with the incompletely assembled cover. However, this system in particular has the disadvantage of having to have part of the circuit integrated in the cover, thereby increasing the complexity and the cost of the appliance.

Document CN 202154560U discloses an oven closed by a cover comprising electrical elements. A strip contactor is interposed between the cover and the oven for enabling the power supply circuit to be turned off if the cover is removed or incorrectly positioned. This appliance also has the disadvantage of proposing a cover that is complex and expensive, as the latter has electrical elements and an electrical circuit for supplying power thereto. Lastly, the strip conductor evidently has conductive parts that are accessible to the user, which poses problems in terms of safety.

An object of the present invention is to address the disadvantages of the above-mentioned prior art documents and in particular, firstly to propose an electrical cooking appliance with a cover that is simple but still ensures safe use, even if the cover is incorrectly positioned or removed.

SUMMARY OF THE INVENTION

To this end, a first aspect of the invention relates to a household electrical cooking appliance comprising:
 a housing with a container arranged such as to receive food to be cooked,
 a removable cover arranged such as to close the container while cooking,
 at least one safety switch arranged in the housing for turning off at least one electrical circuit of the appliance when the cover is not closing the container, and for turning on said at least one electrical circuit when the cover is closing the container,
 a cam with at least one control surface arranged such as to actuate a key for controlling said at least one safety switch in a direction in which the control key is pressed, characterized in that the cover comprises a control finger arranged such as to actuate a surface for inputting the cam in a direction for moving the input surface in a direction that is different from the direction of pressing:
 in order to turn off said at least one electrical circuit while the container is open,
 in order to turn on said at least one electrical circuit while the container is closed.

The appliance of the present invention ensures safe use with the circuit turned off when the cover is not closing the container, and because the cam of the housing is actuated by the control finger in order to turn the electrical circuit off/on, it is not necessary to install a portion of the electrical circuit on the cover. In other words, the cover only comprises the mechanical control element (the finger) for actuating the electrical circuit of the housing, which is separate from the cover. Moreover, the present invention enables the use of simplified safety switches because the control key is subjected to a mechanical load in the direction in which it is pressed. There is no need for providing switches designed to resist forces exerted on the control key in a direction other than the one in which the key is pressed. Such a switch (one capable of withstanding an actuation force exerted at a 45° angle to the pressing direction, for example) is more expensive than the kind of switch required by the invention (one in which the actuation force is parallel to the direction in which the key is pressed). Furthermore, with a direction for moving the input surface that differs from the direction in which the control key is pressed, the designer of the appliance has more freedom in terms of installing the switch, as the latter is no longer linked to the direction for moving the input surface.

According to an aspect of the invention, the control finger is arranged such as to be inserted in and withdrawn from the appliance during the closing and opening, respectively, of the container in a direction of insertion and withdrawal that is perpendicular to the direction for moving the input surface. On its input surface, the cam bears the force exerted by the finger in a direction different from the one in which the input surface is moved.

According to an aspect of the invention, the control finger has a predefined thickness and the movement of the surface for inputting the cam in the direction for moving the input surface for turning the electrical circuit on or off is equal to the predefined thickness of the control finger. The travel path of the surface for inputting the cam defines the travel path of the control surface and therefore the control of the switch. According to this embodiment, these travel paths are defined by the thickness of the control finger and consequently the precision of the travel path depends solely on the thickness of the finger, thus making it easier to control for variability during series production.

According to an aspect of the invention, the appliance has a fix-mounted guide stop arranged in such a way that the control finger slides between the surface for inputting the cam and the fix-mounted guide stop as it is inserted into and withdrawn from the appliance. Better guidance is thus achieved, and the fix-mounted guide stop absorbs the forces exerted on the finger by the cam in such a way that the structure of the finger can be simplified.

According to an aspect of the invention, the electrical circuit has a phase and a neutral, the appliance comprises a safety switch for the phase and a safety switch for the neutral, and the cam comprises a separate control surface for each safety switch. This implementation ensures the safety of the phase circuit and of the neutral circuit and offers the option of offsetting the two switches relative to one another.

According to an aspect of the invention, the appliance comprises an axis of rotation, the cam is arranged such as to pivot about the axis of rotation, and the safety switches and the respective control surfaces of the cam are angularly offset and arranged in a common plane. This implementation improves the compactness of the appliance.

According to an aspect of the invention, the appliance comprises an elastic element arranged such as to exert a constant force on the cam, which tends to turn off said at least one electrical circuit. The return of the cam to the position for turning the electrical circuit off ensures safe use by systematically restoring the cam to the position for turning the electrical circuit off. In an advantageous manner, the safety switch or switches itself (themselves) comprise(s) this elastic element, which ensures a return to the off-position of the electrical circuit.

According to an aspect of the invention, the electrical circuit is a heating circuit and/or a circuit for supplying power to a motor for driving in rotation a rotary tool positioned in the container.

According to an aspect of the invention, the appliance forms a deep fryer.

An aspect of the invention also relates to a household electrical appliance for cooking and/or reheating food, comprising
- a housing with a tank arranged such as to receive food to be cooked and/or reheated,
- a removable cover arranged such as to close the tank while cooking and/or reheating,
- at least one heating element and a fan arranged such as to create a closed hot air flow while cooking and/or reheating,
- a ventilation sheath comprising a suction inlet arranged on one side of the tank, a ventilation outlet above the tank and arranged such as to direct the hot air flow onto the food while cooking and/or reheating, characterized in that the ventilation sheath is in one piece and separated from the cover.

The appliance of the present invention proposes a simple cover in which the ventilation sheath is not integrated, and because the ventilation sheath is separated from the cover, there is no interaction between the cover and the ventilation sheath and manufacturing tolerances are therefore not dictated by these factors. It should be noted that a closed circuit for such an appliance means that the majority of the air flow is recirculated, but that air leaks between the cover and the housing are possible.

According to an embodiment, the cover comprises a handle arranged on an upper portion of the cover opposite the ventilation sheath, and the cover has a double wall on the upper portion on which the handle is arranged. With this implementation of the invention, the user is well-protected from burn hazards by the double wall, which insulates the handle from the heat radiated onto the cover by the ventilation sheath.

According to an embodiment, the ventilation outlet forms an outlet surface oriented at an angle between 10° and 80° with the horizontal. With the ventilation outlet oriented downwards the air flow is directed directly onto the food, without losses or pointless turbulence.

The tank is removably mounted in the appliance, and the ventilation sheath is dimensioned such as to allow the tank to be inserted in the appliance and removed therefrom by tilting the tank slightly. Positioning is thus simplified.

According to an embodiment, the appliance comprises a wall surrounding the tank and arranged at a predefined distance from the tank in order to allow the air flow projected onto the food to advance toward the suction inlet of the ventilation sheath.

According to an embodiment, said at least one heating element is arranged in the ventilation sheath downstream of the fan. This implementation gives rise to a ventilation sheath-heating element sub-assembly that can optionally be supplied to the main assembly line in fully assembled form.

According to an embodiment, the fan is a centrifugal fan that comprises an impeller arranged laterally to the tank, and the ventilation sheath is arranged above the impeller.

According to an embodiment, the ventilation sheath is metal.

According to an embodiment, the appliance comprises a stirring means for automatically coating said food with a film of fat by stirring said food together with fat.

According to an embodiment, the stirring means comprises at least one blade arranged in the tank and turning about an axis of rotation.

BRIEF DESCRIPTION OF THE DRAWINGS

Other features and advantages of the present invention will emerge more clearly upon reading the following detailed description of an embodiment of the invention, which is given as an example that is not limiting in any way and which is illustrated by the appended drawings, wherein.

DETAILED DESCRIPTION OF THE INVENTION

According to the invention, the appliance is a household appliance, i.e., one specifically designed and dimensioned for household use, in a family setting for example. To this end, the appliance can be manually manipulated by the user thereof, for example in order to move it from a cupboard to a work surface. In other words, preference is given to the appliance being portable.

The appliance of the invention is preferably designed and dimensioned for cooking and/or heating certain foods such as potato chunks.

The general design of the appliance of the invention allows considerable versatility in terms of cooking methods such that the term "cooking" used here covers different methods of preparing food such as frying, browning, roasting, or searing.

In a preferred alternative embodiment, which corresponds to the examples illustrated in the figures, the appliance of the invention is preferably designed and dimensioned for heat treating food in such a way as to confer the latter with gustatory qualities essentially equivalent or close to those of fried food, and specifically food fried in an oil bath. In this alternative embodiment, the appliance of the invention therefore constitutes a fryer, and more particularly a deep fryer. Here deep frying is used to designate a method of cooking food without immersion (whether partial and/or temporary) of the latter in a bath of oil or fat during the cooking cycle.

Rather, the expression deep frying designates cooking in which the food is admittedly moistened by a cooking medium (for example oil), but without being immersed or soaking in said medium. In this respect the operating principle of the fryer according to the invention differs from that of a standard oil bath fryer, particularly in that it allows the creation of conditions for establishing a Maillard reaction sufficient for conferring the golden, crispy texture of fried foods to the food without said food having been completely and directly immersed in a bath of burning oil.

Figure 1:
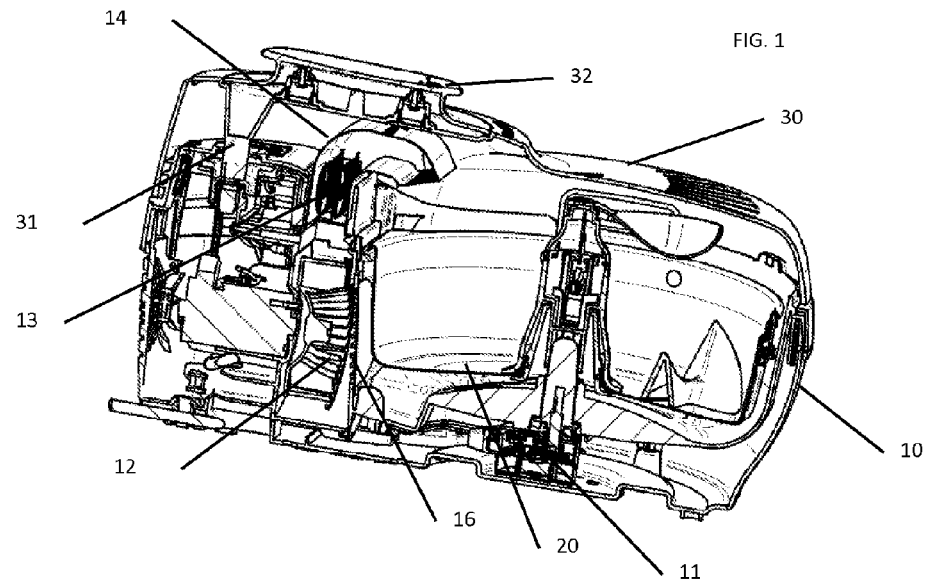
FIG. 1 shows a cutaway perspective view of an appliance of the present invention.

FIG. 1 shows an appliance for cooking and/or reheating foods according to the present invention, with a housing 10 and a cover 30.

The housing 10 holds a container 20, which is mounted and arranged such as to receive the food to be cooked and/or reheated and in which is arranged a blade 15 turning about an axis of rotation and driven in rotation by a motor 11 for stirring the food and coating it with a layer of fat.

The housing 10 also comprises a fan and a heating resistor 13 arranged such as to create a closed hot air flow that will be directed onto the food in the container 20 in order to cook and/or reheat said food. The ventilation circuit comprises an impeller 12 of the fan, which is arranged such as to suction the air located around the container 20 through a grill 16 and convey it to a heating resistor 13, which is arranged in an air duct system 14. The latter comprises a ventilation outlet arranged above the container 20 and oriented downwards in order to direct the expelled air flow to the food contained in the container.

The cover 30 is detachable from the housing 10, meaning that it can be removed entirely from the latter in order to put food in the container or to remove it therefrom. For the sake of ergonomics, the cover 30 comprises a handle 32 for easy manipulation.

For the sake of ergonomics, the cover 30 can be removed without any unlocking operation, even while the cooking appliance is in use, and in this case the power circuits, specifically the heating and the stirring of the food, must be turned off for safety reasons.

To this end, the cover 30 has a finger 31 that controls a cam for actuating safety switches 41 and 45 that turn off the electrical circuits, as will be explained with reference to FIG. 2.

Figure 2:
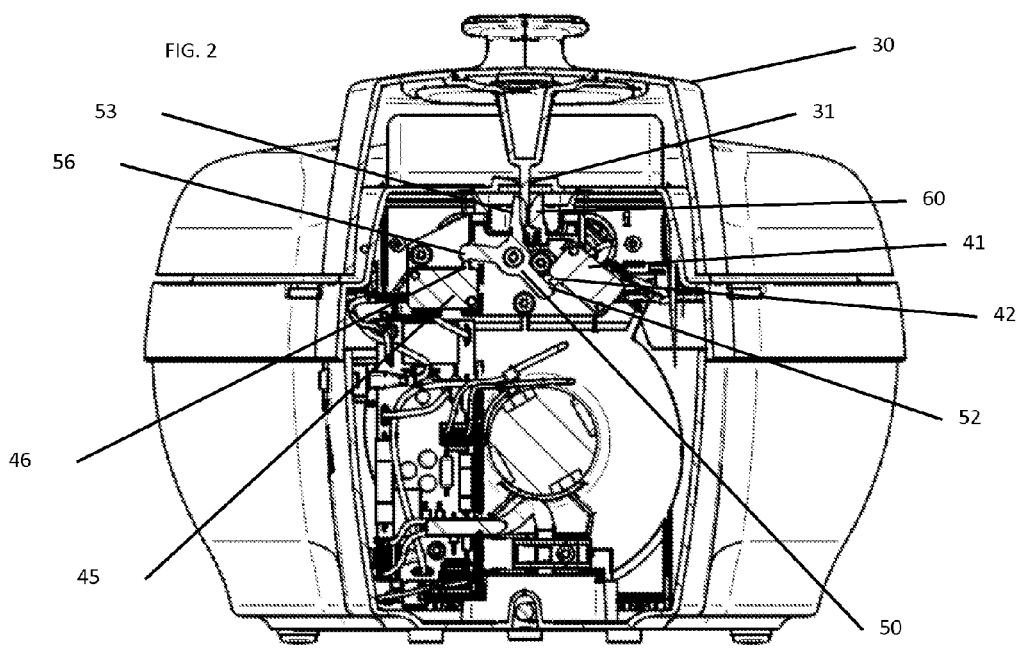
FIG. 2 shows cross-sectional view in a plane parallel to the plane comprising the safety switches of the appliance of FIG. 1.

FIG. 2 shows a cross-section of the appliance of FIG. 1 along a plane parallel to the mounting plane of the safety switches. The electrical appliance illustrated here comprises a phase circuit and a neutral circuit, and two switches 41 and 45 arranged for opening (turning off) or closing (turning on) each circuit in such a way that, when the cover 30 is opened, each circuit is as well in order to cut off the power supply to the electrical elements such as the heating resistors 13, the fan, and the electric motor 11 for driving the rotary blade.

The cover 30 closes the container 20, and the control finger 31 is engaged between the fix-mounted guide stop 60 and the movable cam 50. This movable cam 50 is actuated by the control finger 31 on its input surface 53 in contact with the control finger 31. As the container 20 is being closed by the cover 30, the control finger 31 descends in a vertical direction, wherein it is inserted between the input surface 53 and the fix-mounted guide stop 60. The thickness of the control finger causes the input surface 53 to rotate in a direction of movement essentially perpendicular to the direction for inserting the control finger 31. The cam 50 comprises two other arms having the control surfaces 52 and 56, which are each arranged opposite the respective control keys 42 and 46 of the safety switches 41 and 45. Each control key 42 and 46 is pressed in a pressing direction, the safety switches 41 and 45 and the cam 50 being arranged such that the direction in which each control key 42 and 46 for the safety switches 41 and 45 is pressed is essentially identical to the direction in which each respective control surface 52 and 56 is moved. In this manner the control keys 42 and 46 are not subjected to forces directed in a direction other than the one in which they are pressed. This implementation enables the use of inexpensive safety switches that do not need to withstand forces exerted on their control keys in a direction different from the one in which they are pressed.

The cam 50 comprises two arms which each have a control surface 52 and 56 such that the safety switches 41 and 45 can be offset from one another in order to achieve more compactness and in order to arrange them in a common plane.

Furthermore, as mentioned above, it is the thickness of the control finger 31 that defines the travel path of the input surface 53. Hence the travel path is only influenced by the tolerance on the thickness of the control finger 31, thus reducing the possibilities of variance.

The fix-mounted guide stop 60 of the control finger 31 in turn enables the absorption of the forces exerted by the cam 50 on the control finger 31, hence making the provision of a bend-resistant structure on the control finger unnecessary.

It should be understood that diverse modifications and/or improvements obvious to persons skilled in the art may be made to the different embodiments of the invention described in this description, without exceeding the scope of the invention defined by the appended claims. In particular, mention is made of a rotary cam; however, the use of a linearly displaceable return cam is conceivable.

The invention claimed is:

1. Household electrical appliance for cooking food, comprising:
    a housing with a container arranged such as to receive the food to be cooked,
    a removable cover arranged such as to close the container while cooking, wherein the cover comprises a control finger,
    at least one safety switch arranged in the housing for turning at least one electrical circuit of the appliance off when the cover is not closing the container, and for turning said at least one electrical circuit on when the cover is closing the container,
    a cam arranged to pivot around an axis of rotation, and comprising at least one control surface arranged such as to actuate a key for controlling said at least one safety switch in a direction in which the control key is pressed, and comprising an input surface arranged to be moved by the control finger,
    wherein the control finger is arranged such as to actuate the input surface of the cam in a direction that is different from the direction of pressing whereby,
    said at least one electrical circuit is turned off while the container is open, and
    said at least one electrical circuit is turned on while the container is closed,
    wherein the control finger is arranged in the cover such that the control finger is inserted in and withdrawn from the appliance by movement of the cover during a closing and opening of the container, in a direction for inserting and withdrawing that is perpendicular to the direction for moving the input surface and perpendicular to the axis of rotation of the cam.

2. Appliance as in claim 1, wherein the control finger has a predefined thickness and wherein a movement of the surface for inputting the cam in a direction for moving the input surface for turning the at least one electrical circuit on or off is equal to the predefined thickness of the control finger.

3. Appliance as in claim 1, wherein the appliance has a fix-mounted guide stop arranged in such a way that the control finger slides between the surface for inputting the cam and the fix-mounted guide stop as it is inserted in and withdrawn from the appliance.

4. Appliance as in claim 1, wherein the at least one electrical circuit has a phase and a neutral, wherein the appliance comprises a safety switch for the phase and a safety switch for the neutral, and wherein the cam comprises a separate surface for controlling each safety switch.

5. Appliance as in claim 4, wherein the appliance comprises an axis of rotation, wherein the cam is arranged such as to pivot about the axis of rotation, and wherein the safety switches and the respective control surfaces of the cam are angularly offset and arranged in a common plane.

6. Appliance as in claim 1, comprising an elastic element arranged to exert a constant force on the cam.

7. Appliance as in claim 6, wherein the at least one electrical circuit is one of a heating circuit or a circuit for supplying power to a motor for driving in rotation a rotary tool positioned in the container.

8. Appliance as in claim 1, wherein the appliance is a deep fryer.

\* \* \* \* \*

UNITED STATES PATENT AND TRADEMARK OFFICE
CERTIFICATE OF CORRECTION

PATENT NO.         : 10,154,750 B2  
APPLICATION NO.    : 14/431090  
DATED              : December 18, 2018  
INVENTOR(S)        : Bernard Allemand et al.

It is certified that error appears in the above-identified patent and that said Letters Patent is hereby corrected as shown below:

On the Title Page

Column 1, (Item (71)) Applicant, Line 1, delete "SEB.S.A.," and insert -- SEB S.A., --

Signed and Sealed this  
Twenty-sixth Day of March, 2019

Andrei Iancu  
*Director of the United States Patent and Trademark Office*